US012598579B2

(12) United States Patent
Lam

(10) Patent No.: US 12,598,579 B2
(45) Date of Patent: Apr. 7, 2026

(54) COLLABORATIVE GEOLOCATION OF AN ACCESS POINT

(71) Applicant: Ruckus IP Holdings LLC, Claremont, NC (US)

(72) Inventor: Chih-Ming Kiran Lam, Singapore (SG)

(73) Assignee: Ruckus IP Holdings LLC, Horsham, PA (US)

( * ) Notice: Subject to any disclaimer, the term of this patent is extended or adjusted under 35 U.S.C. 154(b) by 336 days.

(21) Appl. No.: 18/508,363

(22) Filed: Nov. 14, 2023

(65) Prior Publication Data

US 2024/0163837 A1 May 16, 2024

Related U.S. Application Data

(60) Provisional application No. 63/425,322, filed on Nov. 15, 2022.

(51) Int. Cl.
*H04W 64/00* (2009.01)

(52) U.S. Cl.
CPC ................................. *H04W 64/003* (2013.01)

(58) Field of Classification Search
CPC ......... H04W 4/02; H04W 4/06; H04W 64/00; H04W 88/02
See application file for complete search history.

(56) References Cited

U.S. PATENT DOCUMENTS

2013/0082878 A1* 4/2013 Jarvis .................... G01S 5/0278
342/458

* cited by examiner

*Primary Examiner* — Sam Bhattacharya
(74) *Attorney, Agent, or Firm* — Myers Bigel, P.A.

(57) ABSTRACT

A computer system (such as a controller) that distributes locations of access points is described. During operation, the computer system may receive, from the access points, information specifying the locations of the access points, uncertainties in the locations, and results of wireless scans. Then, the computer system may provide, to the access points, second information specifying the locations, the uncertainties in the locations, and the results of the wireless scans. Next, the computer system may receive, from the access points, third information specifying second locations of the access points and second uncertainties in the second locations, where the third information received from a given access point in the access points includes revisions to a location of the given access point and/or an uncertainty in the location. These revisions may be based at least in part on the second information.

20 Claims, 11 Drawing Sheets

300

PERFORM A WIRELESS SCAN
310

CALCULATE A LOCATION
312

PROVIDE INFORMATION
314

RECEIVE SECOND INFORMATION
316

CALCULATE SECOND INFORMATION
318

PROVIDE THIRD INFORMATION
320

PERFORM ONE OR MORE ADDITIONAL
OPERATIONS
322

COLLABORATIVE GEOLOCATION OF AN ACCESS POINT

CROSS REFERENCE TO RELATED APPLICATIONS

This application claims priority under 35 U.S.C. 119(e) to U.S. Provisional Application Ser. No. 63/425,322, "Collaborative Geolocation of an Access Point," filed on Nov. 15, 2022, by Chih-Ming Lam, the contents of which are herein incorporated by reference.

FIELD

The described embodiments relate to techniques for collaboratively determining a location of an access point.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network or WLAN (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network.

Recent and planned IEEE 802.11 standard provide the option to use an unlicensed 6 GHz band of frequencies to improve communication performance. However, in order to use this band of frequencies (e.g., at standard power level) when deployed outdoors or indoors, an access point in a WLAN may need to automatically discover its position or location (such as the longitude, latitude and height of the access point), and may need to report the location to an Automated Frequency Coordination (AFC) server for approval. Based at least in part on the location, the AFC server may respond with a list of channels in the 6 GHz band of frequencies that the access point is permitted to safely use without causing interference issues to incumbents in vicinity or proximity to the access point. However, existing geolocation solutions, such as equipping each access point with a Global Positioning System (GPS) receiver, are often costly and complicated.

SUMMARY

In a first group of embodiments, a computer system that distributes locations of access points is described. This computer system includes: an interface circuit that communicates with access points; a processor; and memory that stores program instructions. During operation, the computer system receives, associated with the access points, information specifying the locations of the access points, uncertainties in the locations, and results of wireless scans, where the information received from a given access point in the access points includes a location of the given access point, an uncertainty in the location and a result of a wireless scan performed by the given access point. Then, the computer system provides, addressed to the access points, second information specifying the locations, the uncertainties in the locations, and the results of the wireless scans. Next, computer system receives, associated with the access points, third information specifying second locations of the access points and second uncertainties in the second locations, where the third information received from the given access point in the access points includes a second location of the given access point and a second uncertainty in the second location, and where the second location and the second uncertainty include revisions to the location and the uncertainty.

Note that the locations and the uncertainties are based at least in part on known locations of second access points. Moreover, the second access points may include GPS receivers. Furthermore, the access points may not include GPS receivers.

Additionally, the computer system may include a controller of the access points.

In some embodiments, the result of the wireless scan may include received signals strengths associated with one or more of the access points measured by the given access point.

Note that the wireless scan is in a 6 GHz band of frequencies or a 7 GHz band of frequencies.

Moreover, the third information may include second results of second wireless scans, where the third information received from the given access point includes a second result of a second wireless scan performed by the given access point.

Furthermore, the locations may include two-dimensional locations, such as longitude and latitude. Additionally, the locations may include a common height of the access points. For example, the common height may be one half of a height of a building that includes the access points or may be a user-reported height.

In some embodiments, the computer system may receive, associated with the given access point, a request for the second information, and the computer system may provide the second information addressed to the given access point in response to the request.

Moreover, the results of the wireless scans may include reduced neighbor reports.

Furthermore, the computer system may provide, addressed to the access points, the known locations of the second access points.

Another embodiment provides a computer-readable storage medium for use with the computer system. This computer-readable storage medium may include program instructions that, when executed by the computer system, cause the computer system to perform at least some of the aforementioned operations.

Another embodiment provides a method. This method includes at least some of the operations performed by the computer system.

In a second group of embodiments, an access point that calculates a location of the access point is described. This access point includes: an interface circuit that communicates with a computer system; a processor; and memory that stores program instructions. During operation, the access point performs a wireless scan, where a result of the wireless scan includes one or more received signal strengths of at least a subset of access points. Then, the access point calculates the location of the access point and an uncertainty in the location based at least in part on the result of the wireless scan and one or more known locations of one or more second access points. Moreover, the access point provides, addressed to the computer system, information specifying the location, the uncertainty in the location and the result of the wireless scan. Next, the access point receives, associated with the computer system, second information specifying locations of the access points, uncertainties in the locations of the access points, and results of second wireless scans associated with the access points. Furthermore, the access point calculates a second location of the access point and a second uncertainty in the second location based at least in part on the results of the second wireless scans and the one or more known locations of the one or more second access points. Additionally, the access point provides, addressed to the computer system, third information specifying the second location and the uncertainty in the second location.

Note that the second information may include the location, the uncertainty and the result of the wireless scan.

Moreover, the one or more second access points may include GPS receivers. Furthermore, the access point and the access points may not include GPS receivers.

Additionally, the computer system may include a controller of the access point.

In some embodiments, the wireless scan is in a 6 GHz band of frequencies or a 7 GHz band of frequencies.

Moreover, the locations may include two-dimensional locations, such as longitude and latitude. Furthermore, the location and/or the locations may have a common height. For example, the common height may be one half of a height of a building that includes the access point and the access points or may be a user-reported height.

In some embodiments, the access point may provide, addressed to the computer system, a request for the second information.

Moreover, the result of the wireless scans may include a reduced neighbor report.

Furthermore, an upper bound on the location and/or the second location may be calculated based at least in part on path loss in free space.

Additionally, the location and the second location may be calculated using a shortest-path technique.

In some embodiments, the access point may receive, associated with the computer system, the one or more known locations of the one or more second access points.

Another embodiment provides a computer-readable storage medium for use with the access point. This computer-readable storage medium may include program instructions that, when executed by the access point, cause the access point to perform at least some of the aforementioned operations.

Another embodiment provides a method. This method includes at least some of the operations performed by the access point.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
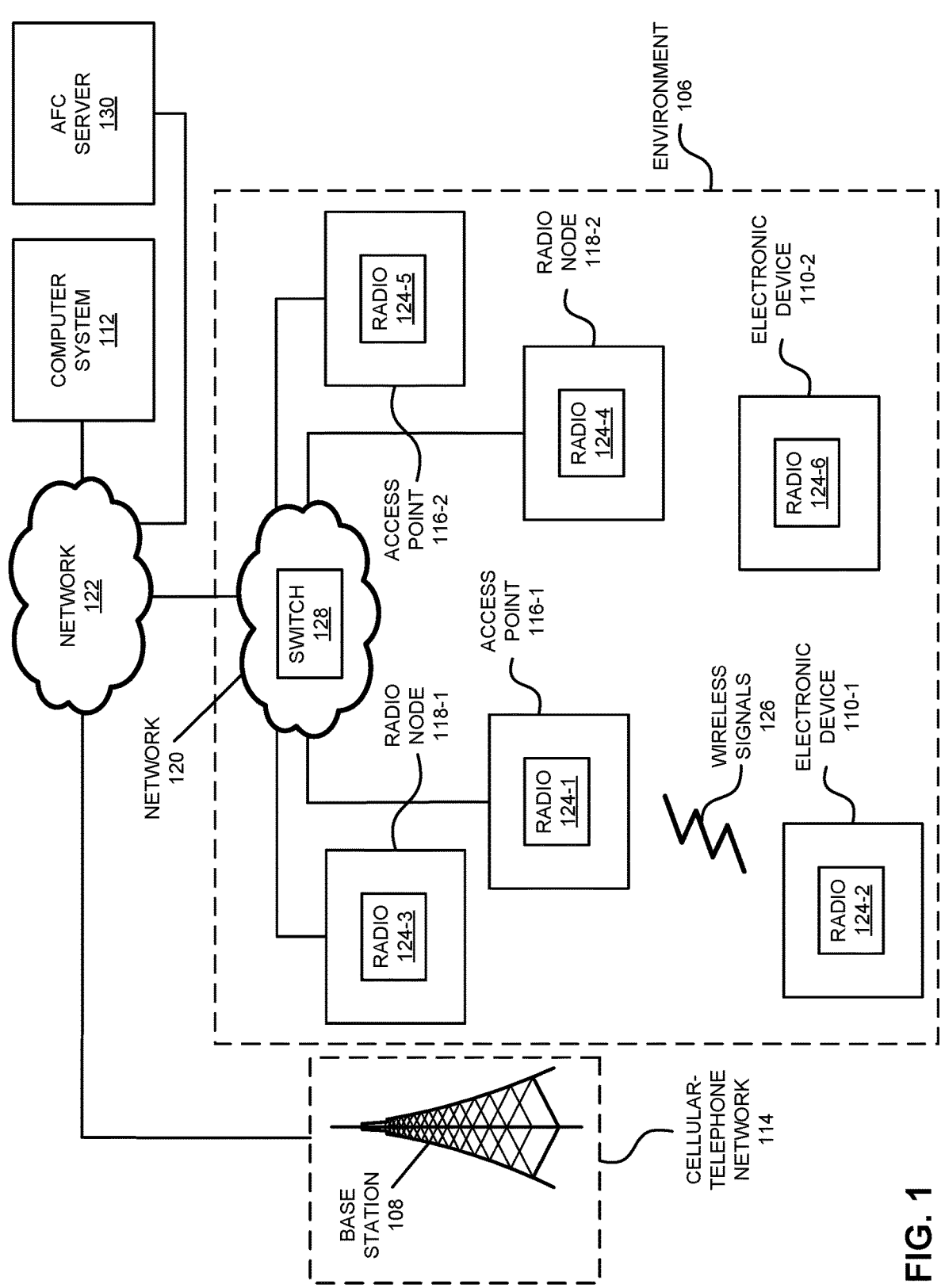
FIG. 1 is a block diagram illustrating an example of a system in accordance with an embodiment of the present disclosure.

In a first group of embodiments, a computer system (such as a controller) that distributes locations of access points is described. During operation, the computer system may receive, from the access points, information specifying the locations of the access points, uncertainties in the locations, and results of wireless scans. Then, the computer system may provide, to the access points, second information specifying the locations, the uncertainties in the locations, and the results of the wireless scans. Next, the computer system may receive, from the access points, third information specifying second locations of the access points and second uncertainties in the second locations, where the third information received from a given access point in the access points includes revisions to a location of the given access point and/or an uncertainty in the location. These revisions may be based at least in part on the second information.

In a second group of embodiments, an access point that calculates a location of the access point is described. During operation, the access point may perform a wireless scan, where a result of the wireless scan includes one or more received signal strengths of at least a subset of access points. Then, the access point may calculate the location of the access point and an uncertainty in the location based at least in part on the result of the wireless scan and one or more known locations of one or more second access points. Moreover, the access point may provide, to a computer system, information specifying the location, the uncertainty in the location and the result of the wireless scan. Next, the access point may receive, from the computer system, second information specifying locations of the access points, uncertainties in the locations of the access points, and results of second wireless scans associated with the access points.

Furthermore, the access point may calculate a second location of the access point and a second uncertainty in the second location based at least in part on the results of the second wireless scans and the one or more known locations of the one or more second access points. Additionally, the access point may provide, to the computer system, third information specifying the second location and the uncertainty in the second location.

By distributing information, these communication techniques may allow access points that do not include GPS receivers to automatically and accurately calculate the locations and the uncertainties. These capabilities may reduce the cost and complexity of the access points. In addition, the calculated locations and uncertainties may allow the access points to operate when indoors or outdoors. Notably, the calculated locations and uncertainties may be needed by the access points when requesting approval from an AFC server to operate in an unlicensed band of frequencies (such as a 6 GHz band of frequencies) when deployed outdoors or indoors. Consequently, the communication techniques may enable use of the unlicensed band of frequencies, which may improve communication performance and, thus, may provide an improved user experience.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer system 112 (which may include one or more computers, and which may be a local or cloud-based controller that manages and/or configures access points 116, radio nodes 118 and/or switch 128, or a cloud-based computer system that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 11:
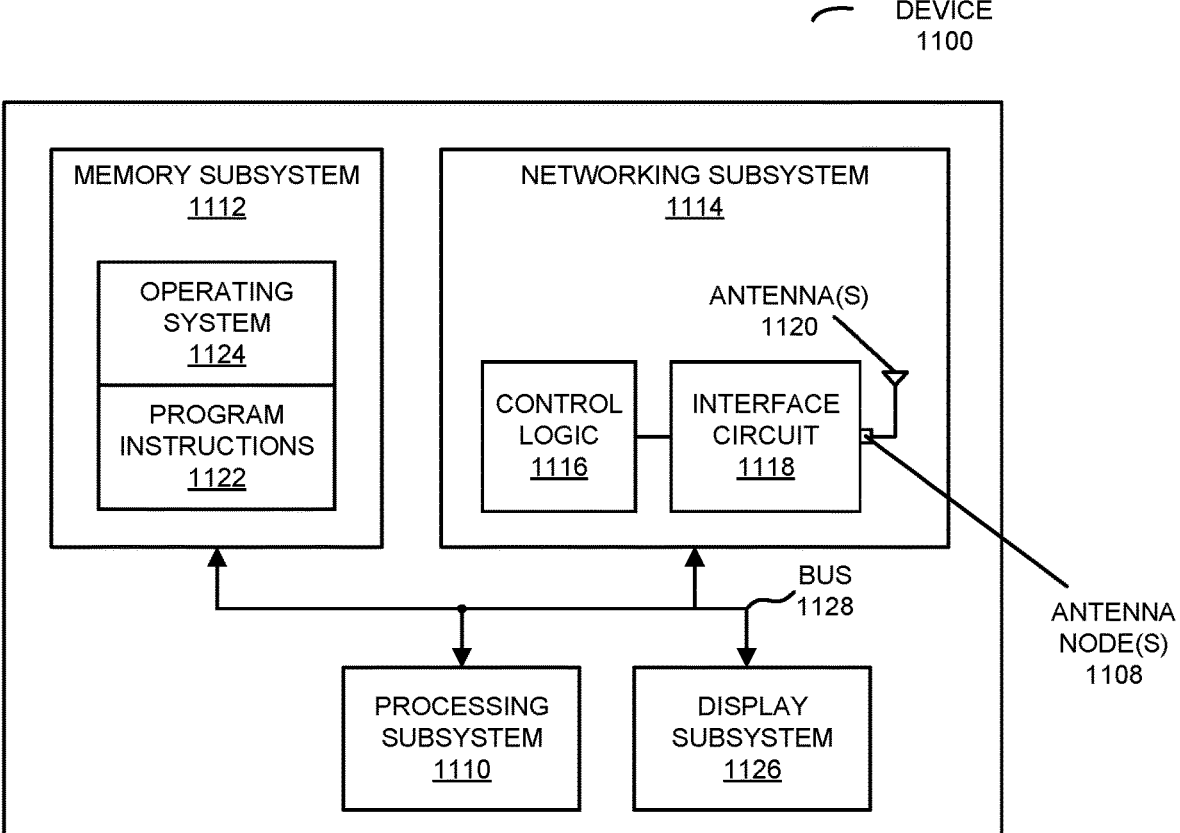
FIG. 11 is a block diagram illustrating an example of an electronic device in accordance with an embodiment of the present disclosure.

As described further below with reference to FIG. 11, electronic devices 110, computer system 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple input, multiple output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be expensive or complicated to calculate locations of access points 116 (and, more generally, computer network devices, such as radio nodes 118). In the discussion that follows, access points 116 are used as illustrative examples.

In order to address these problems, as described below with reference to FIGS. 2-10, computer system 112 and/or access points 116 may perform the communication techniques. Notably, access points 116 may calculated their locations and uncertainties in their locations based at least in part on one or more known locations of one or more of access points 116 and information that is distributed to access points 116 by computer system 112, such as the locations, the uncertainties in the locations and results of wireless scans performed by access points 116 (such as received signal strengths or RRSIs measured by access points 116 in one or more bands of frequencies, e.g., a 6 GHz band of frequencies or a 7 GHz band of frequencies). Note that the one or more known locations of the one or more of access points 116 may be computed by instances of a GPS receiver in these access points (and/or using cellular-telephone network 114). However, a remainder of access points 116 may not include instances of the GPS receiver.

Using the location and the uncertainty of a given access point (such as access point 116-1), access point 116-1 may request approval to operate in the 6 GHz band of frequencies or the 7 GHz band of frequencies (and, more generally, an unlicensed band of frequencies) from an AFC server 130. Note that approved channels or frequencies from AFC server 130 may be valid for a time interval, such as 24 hrs.

In these ways, the communication techniques may enable improved communication performance (which is associated with operation in, e.g., the 6 GHz band of frequencies or the 7 GHz band of frequencies), which reduce the cost and complexity of access points 116 (such as by eliminating the need for all of access points 116 to include instances of the GPS receiver). Consequently, the communication techniques may provide an improved user experience.

In the described embodiments, processing a frame or a packet in a given one of the one or more access points 116 or a given one of the one or more electronic devices 110 may include: receiving wireless signals 126 with the frame or packet; decoding/extracting the frame or packet from the received wireless signals 126 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 116, the one or more electronic devices 110 and/or computer system 112. As another example, in another embodiment, different electronic devices are transmitting and/or receiving frames or packets.

While the preceding embodiments illustrated the communication techniques with only some of access points 116 including instances of a GPS receiver, in other embodiments all of access points 116 may include instances of a GPS receiver. However, only a subset of these access points 116 may be able to receive GPS signals (e.g., they may not have a line-of-sight to a GP satellite), such as when access points 116 are included in an indoor environment.

Figure 2:
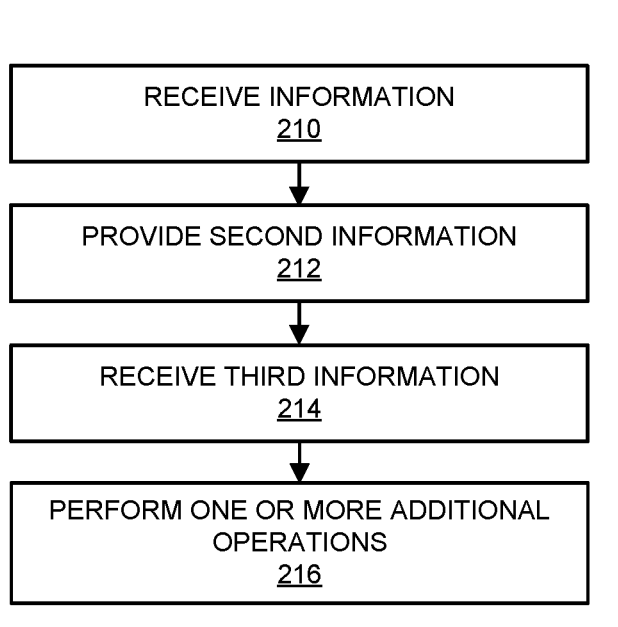
FIG. 2 is a flow diagram illustrating an example method for distributing locations of access points using an electronic device in FIG. 1 in accordance with an embodiment of the present disclosure.

We now describe embodiments of the method. FIG. 2 presents an example of a flow diagram illustrating an example method 200 for distributing locations of access points, which may be performed by a computer system, such as computer system 112 in FIG. 1.

During operation, the computer system may receive, associated with the access points, information (operation 210) specifying the locations of the access points, uncertainties in the locations, and results of wireless scans, where the information received from a given access point in the access points includes a location of the given access point, an uncertainty in the location and a result of a wireless scan performed by the given access point. Then, the computer system may provide, addressed to the access points, second information (operation 212) specifying the locations, the uncertainties in the locations, and the results of the wireless scans. Next, the computer system may receive, associated with the access points, third information (operation 214) specifying second locations of the access points and second uncertainties in the second locations, where the third information received from the given access point in the access points includes a second location of the given access point and a second uncertainty in the second location, and where the second location and the second uncertainty include revisions to the location and the uncertainty.

Note that the locations and the uncertainties are based at least in part on known locations of second access points. Moreover, the second access points may include GPS receivers. Furthermore, the access points may not include GPS receivers.

Additionally, the computer system may include a controller of the access points.

In some embodiments, the result of the wireless scan may include received signals strengths associated with one or more of the access points measured by the given access point.

Note that the wireless scan is in a 6 GHz band of frequencies or a 7 GHz band of frequencies.

Moreover, the third information may include second results of second wireless scans, where the third information received from the given access point includes a second result of a second wireless scan performed by the given access point.

Furthermore, the locations may include two-dimensional locations, such as longitude and latitude. Additionally, the locations may include a common height of the access points. For example, the common height may be one half of a height of a building that includes the access points or may be a user-reported height.

In some embodiments, the results of the wireless scans may include reduced neighbor reports.

In some embodiments, the computer system optionally performs one or more additional operations (operation 216). For example, the computer system may receive, associated with the given access point, a request for the second information, and the computer system may provide the second information addressed to the given access point in response to the request. Moreover, the computer system may provide, addressed to the access points, the known locations of the second access points.

Figure 3:
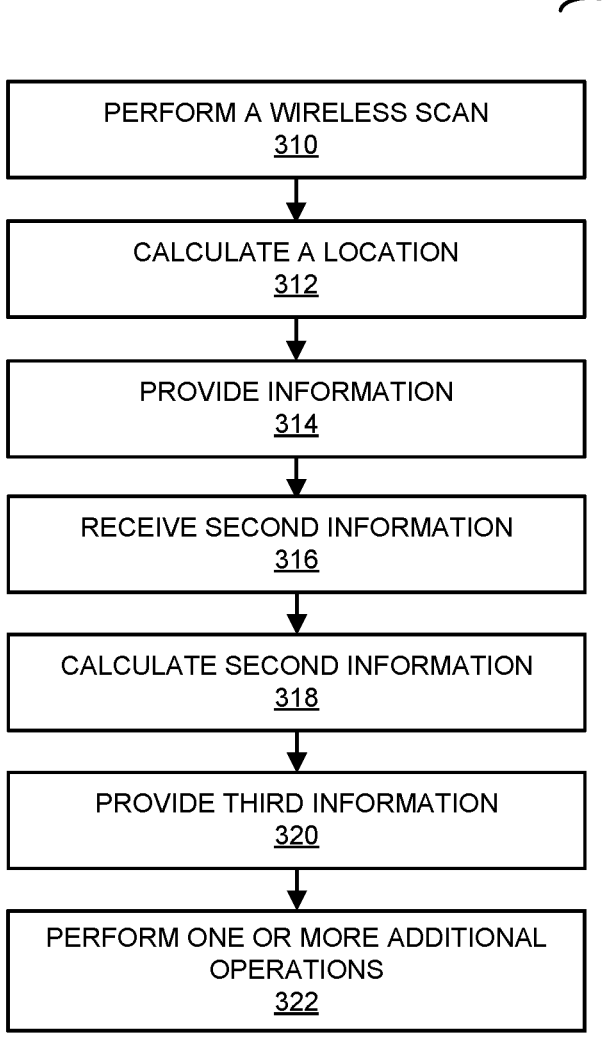
FIG. 3 is a flow diagram illustrating an example method for calculating a location of an access point using an electronic device in FIG. 1 in accordance with an embodiment of the present disclosure.

FIG. 3 presents an example of a flow diagram illustrating an example method 300 for calculating a location of an access point, which may be performed by an access point, such as access point 116-1 in FIG. 1.

During operation, the access point may perform a wireless scan (operation 310), where a result of the wireless scan includes one or more received signal strengths of at least a subset of access points. Then, the access point may calculate the location (operation 312) of the access point and an uncertainty in the location based at least in part on the result of the wireless scan and one or more known locations of one or more second access points. Moreover, the access point may provide, addressed to the computer system, information (operation 314) specifying the location, the uncertainty in the location and the result of the wireless scan. Next, the access point may receive, associated with the computer system, second information (operation 316) specifying locations of the access points, uncertainties in the locations of the access points, and results of second wireless scans associated with the access points. Furthermore, the access point may calculate a second location (operation 318) of the access point and a second uncertainty in the second location based at least in part on the results of the second wireless scans and the one or more known locations of the one or more second access points. Additionally, the access point may provide, addressed to the computer system, third information (operation 320) specifying the second location and the uncertainty in the second location.

Note that the second information may include the location, the uncertainty and the result of the wireless scan.

Moreover, the one or more second access points may include GPS receivers. Furthermore, the access point and the access points may not include GPS receivers.

Additionally, the computer system may include a controller of the access point.

In some embodiments, the wireless scan is in a 6 GHz band of frequencies or a 7 GHz band of frequencies.

Moreover, the locations may include two-dimensional locations, such as longitude and latitude. Furthermore, the location and/or the locations may have a common height. For example, the common height may be one half of a height of a building that includes the access point and the access points or may be a user-reported height.

Additionally, the result of the wireless scans may include a reduced neighbor report.

Moreover, an upper bound on the location and/or the second location may be calculated based at least in part on path loss in free space or a round-trip time (RTT).

Furthermore, the location and the second location may be calculated using a shortest-path technique.

In some embodiments, the access point optionally performs one or more additional operations (operation 322). For example, the access point may provide, addressed to the computer system, a request for the second information. Moreover, the access point may receive, associated with the computer system, the one or more known locations of the one or more second access points.

In some embodiments of methods 200 (FIG. 2) and/or 300, there may be additional or fewer operations. Moreover, there may be different operations. Furthermore, the order of the operations may be changed, and/or two or more operations may be combined into a single operation.

Figure 4:
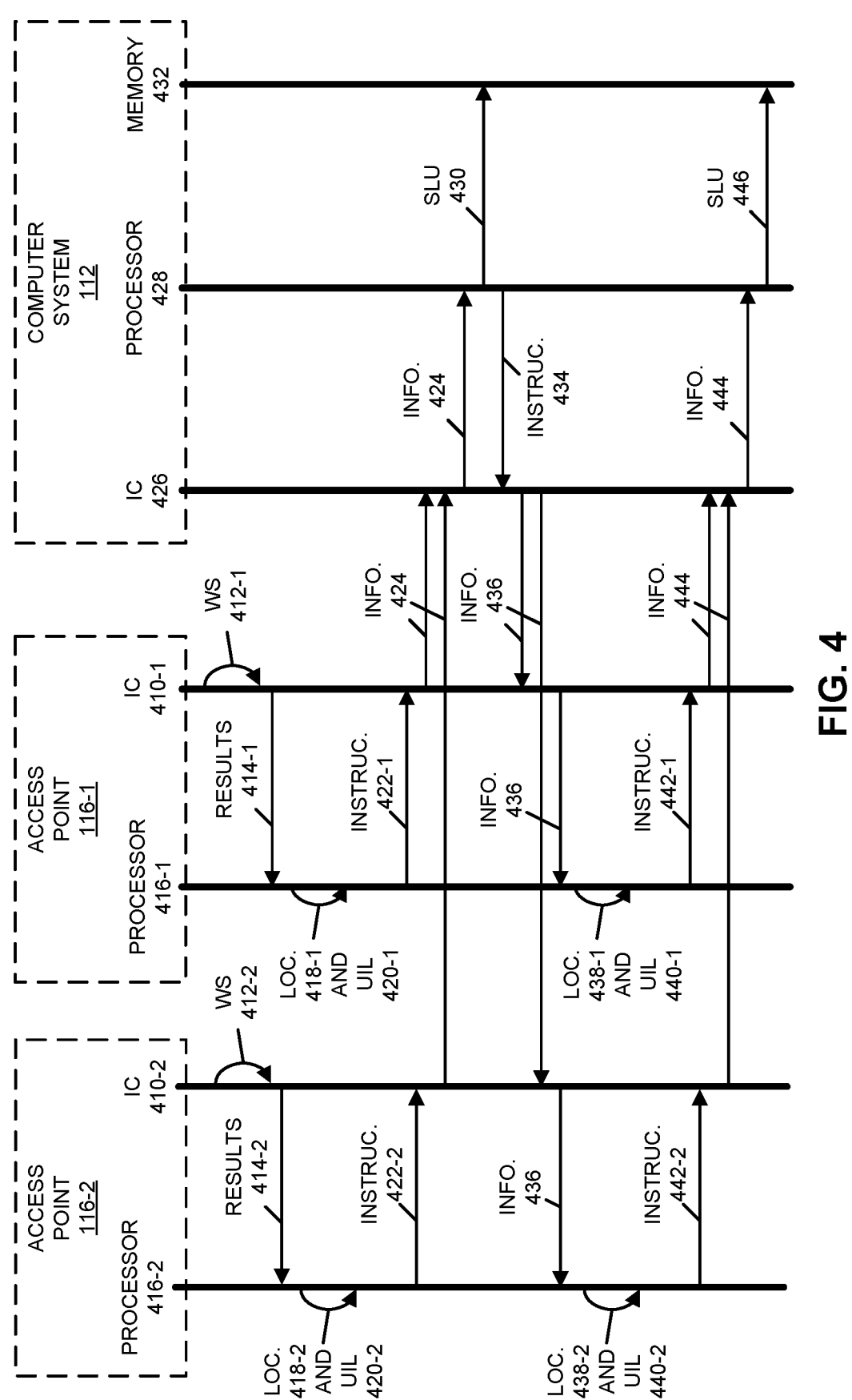
FIG. 4 is a drawing illustrating an example of communication among electronic devices in FIG. 1 in accordance with an embodiment of the present disclosure.

FIG. 4 presents a drawing illustrating an example of communication between access points 116 and computer system 112. In FIG. 4, interface circuits (ICs) 410 in access points 116 may perform wireless scans (WS) 412 in a band of frequencies. Then, interface circuits 410 may report results 414 of wireless scans 412 to processors 416 in access points 116. Based at least in part on results 414 and one or more known locations (KLs) of access points in proximity to access points 116, processors 416 may calculate locations 418 and uncertainties in locations (UIL) 420 of access points 116. Moreover, processors 416 may instruct 422 interface circuits 410 to provide information 424 specifying locations 418, uncertainties in locations 420 and results 414 to computer system 112.

After receiving information 424, an interface circuit 426 in computer system 112 may provide information 424 to a processor 428 in computer system 112. Based at least in part on information 424, processor 428 may update stored locations and uncertainties in locations (SLUs) 430 of access points 116 in memory 432 in computer system 112. For example, processor 428 may aggregate the locations and the uncertainties in the locations using information 424 and may update the stored locations and uncertainties 430. Then, processor 428 may instruct 434 interface circuit 426 to provide information 436 specifying locations 418, uncertainties in locations 420 and results 414 to access points 116.

Moreover, after receiving information 436, interface circuits 410 may provide information 436 to processors 416. Next, processors 416 may use information 436 and one or more known locations of access points in proximity to access points 116 to calculate locations 438 and uncertainties in locations 440 of access points 116. Moreover, processors 416 may instruct 442 interface circuits 410 to provide information 444 specifying locations 438 and uncertainties in locations 440 to computer system 112.

Furthermore, after receiving information 444, interface circuit 426 may provide information 444 to processor 428. Based at least in part on information 444, processor 428 may update stored locations and uncertainties in locations 446 of access points 116 in memory 432. For example, processor 428 may aggregate the locations and the uncertainties in the locations using information 444 and may update the stored locations and uncertainties 446.

While FIG. 4 illustrates some operations using unilateral or bilateral communication (which are, respectively, represented by one-sided and two-sided arrows), in general a given operation in FIG. 4 may involve unilateral or bilateral communication. Moreover, while FIG. 4 illustrates operations being performed sequentially or at different times, in other embodiments at least some of these operations may, at least in part, be performed concurrently or in parallel.

We now further describe the communication techniques. The communication techniques may be implemented as software-based solution that reduces or eliminates the need for additional geolocation hardware, thereby reducing cost and complexity, and providing increased operational flexibility. Moreover, the communication techniques may provide a systematic and efficient way to manage the geolocation needs of access points in large AFC deployments.

Notably, the communication techniques may provide a software framework in which a group of access points, with the help of a coordinating access-point controller, collaborate in an iterative fashion to mutually evaluate and refine their respective calculated locations or positions. In the communication techniques, geolocation hardware may only be needed in a small subset of the access points. Moreover, by using a whole-network approach, network administrators may have a systematic way to manage the geolocation needs of the access points. This may include the ability to: centrally monitor the geolocation status of each access point; analyze where geolocation hardware needs to be installed; and improve planning for a smooth AFC deployment.

In the discussion that follows a geolocation location or position may be defined as a tuple (X, Y, Z, U), where X is the longitude, Y is the latitude, Z is the height above ground and U is the uncertainty. Moreover, U may be defined as a tuple ($U_X$, $U_Y$, $U_Z$) representing the maximum linear deviation (in the direction) of X, Y and Z. Stated differently, the actual position indicated by (X, Y, Z, ($U_X$, $U_Y$, $U_Z$)) may be anywhere within an elliptic cylindrical volume (X±$U_X$, Y±$U_Y$, Z±$U_Z$). Moreover, a set of proximate access points may be defined. This is the set of access points, under the control of a common controller (which is sometimes referred to as a 'access-point controller'), for which locations need to be calculated. Furthermore, the access points in the set of access points are assumed to be at the same height above ground, with a common value for Z and $U_Z$ (values of which may be specified or defined in advance). This may simplify the task in the communication techniques to calculating X, Y, $U_X$ and $U_Y$ for each access point in the set of access points.

Note that at least one access point (and possibly more access points) may be able to compute its absolute location (e.g., by referencing a GPS receiver). This access point is sometimes referred to as a 'pinned access point.' Conversely, an 'unpinned access point' may not be able to determine its position independently, but only with the help of one or more pinned access points, other access points in the set of access points and/or the access-point controller.

Moreover, two access points may be considered to be 'linked' when they are within wireless signal range of each other (e.g., with a wireless-signal strength above a threshold). For a given access point, its radio map may be a list specifying the access points linked to it and their respective observed received signal strengths.

In the communication techniques, unpinned access points may be linked to at least one pinned access point, either directly or indirectly through a series of one or more other unpinned access points, in order to be geolocated. This requirement and a desired or target maximum uncertainty in the calculated locations may be used (e.g., by the access-point controller) to guide where one or more pinned access points are needed in a network.

In some embodiments, the communication techniques may be implemented via geolocation agent software installed and executing on the access points in the set of access points, as well as on the access-point controller. The geolocation agent on each access point may communicate with the geolocation agent on the access-point controller. This communication may be used by the access point to: report on its location and radio map; inquire about the locations and radio maps of other access points; and/or support flexible usage scenarios. For example, the location calculation may be initiated independently on a given access point through a variety of triggers to its geolocation agent, such as: an access point boot event; a periodically scheduled event; and/or a signal or instruction from the access-point controller.

The access-point controller may maintain a table (or a data structure) listing: the access points in the set or access points, their reported locations and their reported radio map observations. A pinned access point may obtain its location from an external geolocation source (such as a GPS receiver that communicates with one or more GPS satellites) and may report this to the access-point controller. Moreover, an unpinned access point may initially report its location as 'unknown' and may request that the access-point controller for the locations and radio maps of the other access points in the set of access points. Furthermore, as described further below, signal-strength observation may be used to approximate the maximum distance between two linked access points based at least in part on a 'path loss' formula and by conservatively assuming free-space propagation conditions with no absorptive or fading losses (e.g., a path-loss exponent set to two). Alternatively, in some embodiments the distance may be based at least in part on a or an RTT, such as using the techniques specified in IEEE 802.11mc. In this technique, the time taken for a wireless signal to travel from an access point to a second access point and back to the access point may be measured. The distance may then be deduced from this RTT measurement by assuming that the wireless signal travels at the speed of light. In principle, RTT has the potential to yield more-precise distance estimates than a path-loss technique. However, RTT measurements may not be possible in some environments. Therefore, in practice, either or both techniques may be used to maximize the number of data points. Note that in some embodiments, RTT is a default technique, and path loss is used when RTT is unavailable.

Note that the set of access points may be modeled as a graph, with each node representing an access point and each edge signifying a linkage between two access points. Additionally, edges may be weighted by the maximum distance (calculated per path-loss formula) between the access points they connect. Applying a 'shortest path' technique on the aforementioned graph, the maximum distance between an unpinned access point and a directly or indirectly linked pinned access point may be determined. The unpinned access point may then be considered to be at the same locations as the pinned access point, but with the uncertainty extended by the maximum distance between them. When an unpinned access point is linked to more than one pinned access point, its location may be considered to be at the mid-point of the intersection of all spatial constrains associated with the pinned access points, where the size of the intersection defines the uncertainty. Then, the unpinned access point may report the calculated location to the access-point controller. This is described further below with reference to FIGS. 8-10.

Figure 5:
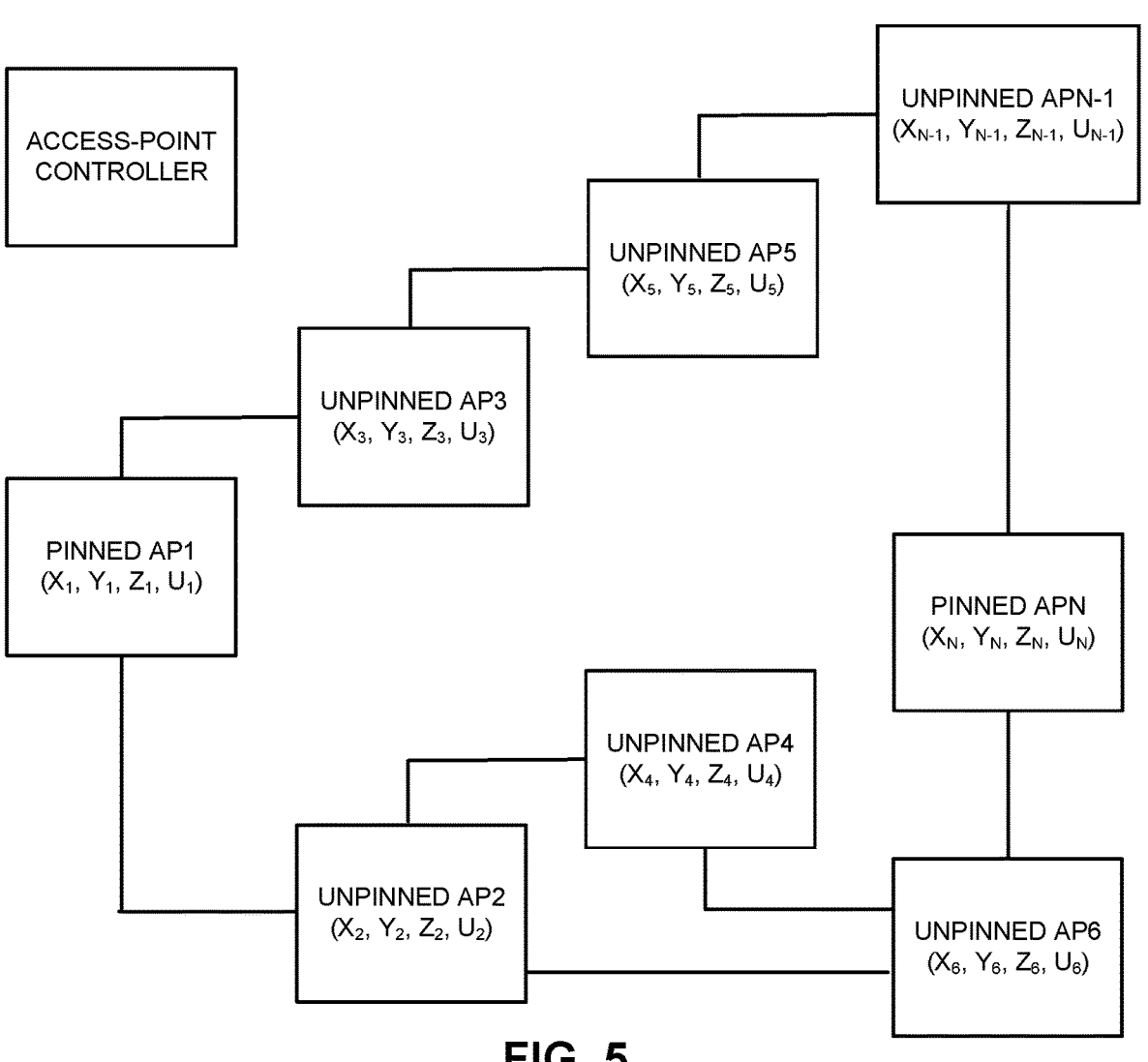
FIG. 5 is a drawing illustrating an example of a geolocation technique in accordance with an embodiment of the present disclosure.

FIG. 5 presents a drawing illustrating an example of a geolocation technique. In FIG. 5, each access point may contact an access-point controller to report its location and radio map and to request the corresponding information for the remaining access points. Note that the location pinning source may be a GPS receiver or some other technique for looking up or computing the absolute location. Moreover, as the number of pinned access points increases, the accuracy of the overall geolocation is improved. For simplicity, the access points may be considered to be at the same height above ground and the communication techniques may be used to calculate the longitudes and latitudes of the access points. Furthermore, the maximum distance between neighboring access points may be calculated from the received signal strength observations. In FIG. 5, access point (AP) 4 may 'hear' access points 2 and 6, but not other access points (the links may indicate whether a strong enough signal can be received). Additionally, the access-point controller may maintain a record of the locations of the access points and their radio maps, and may provide this information to the access points.

Figure 6:
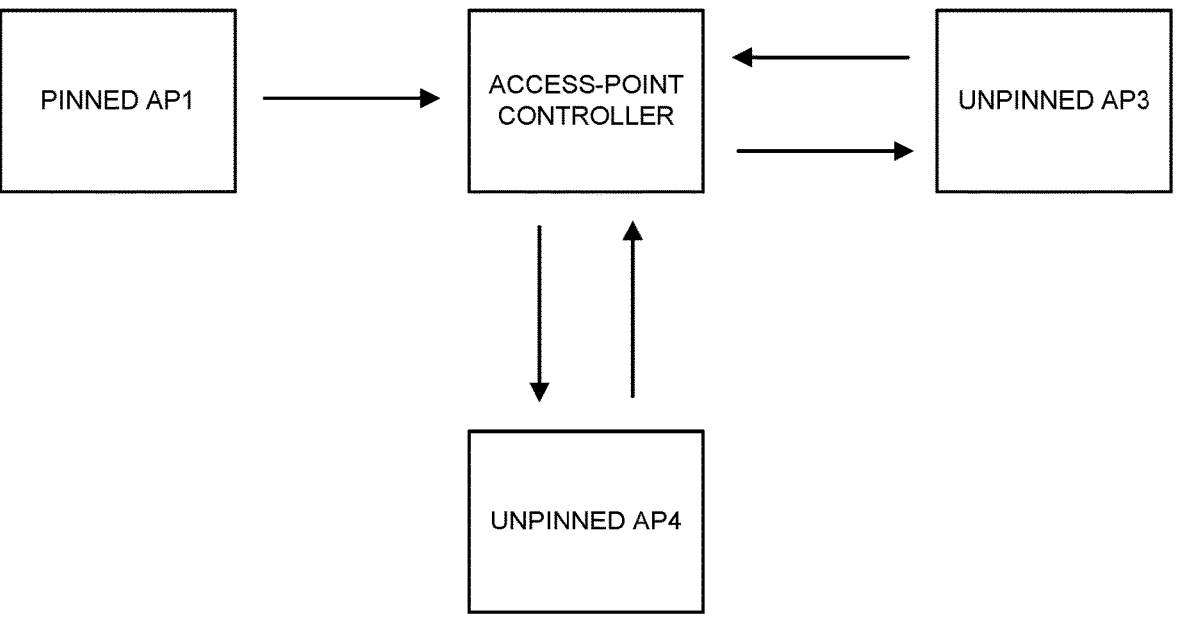
FIG. 6 is a drawing illustrating an example of a geolocation technique in accordance with an embodiment of the present disclosure.

FIG. 6 presents a drawing illustrating an example of a geolocation technique. A pinned access point may detect an external geolocation source (such as one or more GPS satellites) and may use it to compute its location, which then may be reported to the access-point controller that keeps track of the locations of the access points and their radio maps. An unpinned access point may report its location and radio map to the access-point controller and may receive the location and radio maps of the other or remaining access points. The unpinned access point may use the locations and radio maps of the remaining access points to calculate its location and to report this back to the access-point controller. In some embodiments, the access points may communicate with the access-point controller (and, thus, may not directly communicate with each other). However, in other embodiments, the access points may be able to directly communicate with each other.

In a workflow in the communication techniques, an access-point controller may specify access points in a set of access points. Moreover, the access-point controller may specify a height of the access points above ground. If the height of a building is h, then Z may equal $U_Z$ and may equal h/2. During the communication techniques, the access points may be powered on. A geolocation agent on a pinned access point may detect and get its location from an external geolocation source. Moreover, a geolocation agent on an unpinned access point may request, from the access-point controller, locations and radio maps for at least a remainder of the access points in the set of access points and may then use this information to calculate its location. After the geolocation discovery process has stabilized, the access-point controller may check to see whether all the access points in the set of access points can calculate their locations. When there are access points that are unable to geolocate or when the uncertainty is too larger, the access-point controller may recommend that additional geolocation hardware and/or one or more access points be added.

While the present discussion illustrates the communication techniques with the access points calculating their locations, in some embodiments the locations are, at least in part, calculated by the computer system. Thus, one or more operations in the communication techniques may be implemented in a distributed and/or a centralized manner.

Figure 7:
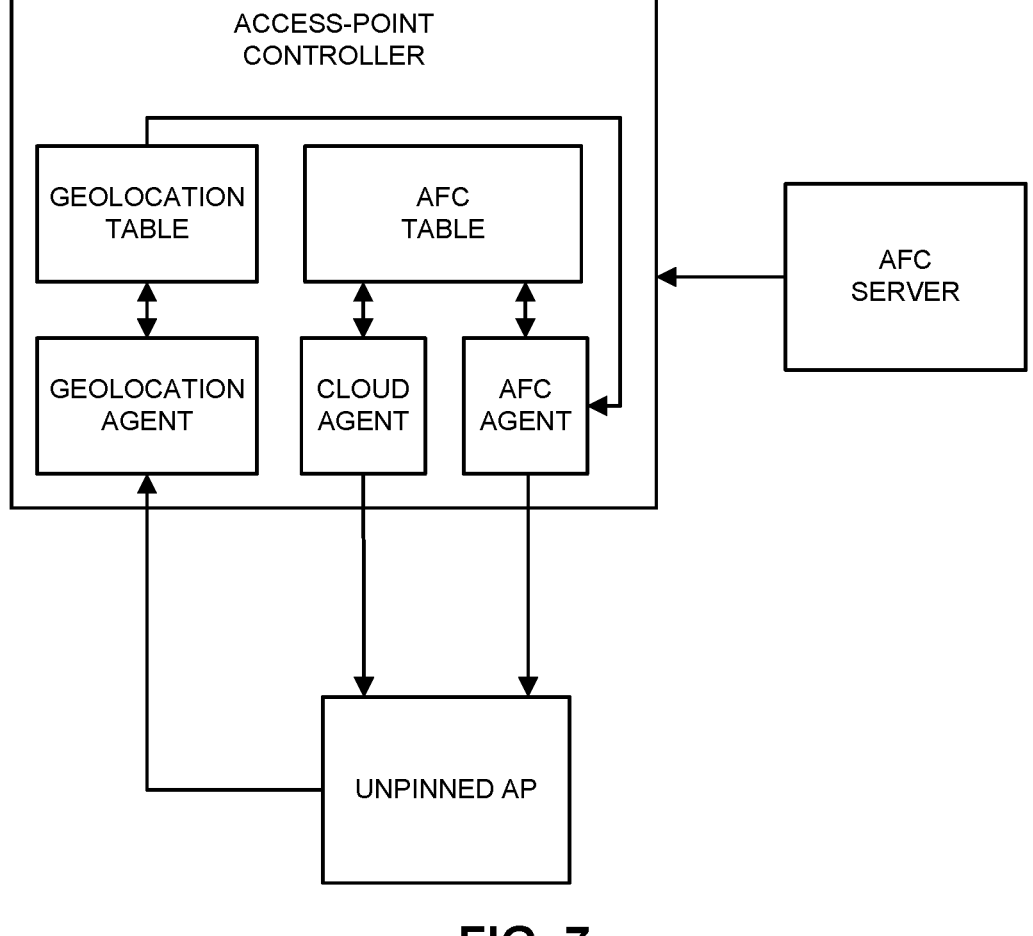
FIG. 7 is a drawing illustrating an example of an Automated Frequency Coordination (AFC) system in accordance with an embodiment of the present disclosure.

FIG. 7 presents a drawing illustrating an example of an AFC system. A network administrator may monitor the geolocation status of the access points in the set of access points and may plan how to improve the geolocation and the AFC system performance. An access point in the set of access points may report its location to the access-point controller. When an access point is operating in a cloud mode, a cloud agent may decide and instruct the access point which permitted AFC channel to use. Alternatively, when an access point is operating in a local mode, an AFC agent may inform the access point of available AFC channels and leave the decision as to which channel to use to the access point. The access-point controller may store a geolocation table (or data structure) with the locations and radio maps of each of the access points. In addition, the access-point controller may store an AFC table (or data structure) that contains the available AFC channels and expiration times for each of the access points. Note that an AFC agent may track the AFC status of each access point and may query an AFC server for new available channels as needed/when necessary.

In summary, the communication techniques may provide good location accuracy. Stated differently, given a location (X, Y, Z, U), there is high probability the access points may be located within the elliptic cylindrical volume defined by it. However, this accuracy may be achieved at the cost of precision, because the uncertainty may need to be set conservatively large for safety reason and because of inherent limitations of the communication techniques when the wireless signal direction is not fully considered. Precision may be improved through strategic placement of more pinned access points. Note that a lack of precision may not preclude the use of an AFC system, but may restrict the number of available channels returned from the AFC server. Thus, the communication techniques may provide a low-cost, 'good-enough' baseline with which to participate in an AFC system, without pinpoint locations. In some embodiments, the location accuracy and precision may be augmented using another location technique (such as a local positioning system, communication with a cellular-telephone network, etc.). In general, the communication techniques may be implemented as part of a complete, end-to-end AFC solution, encompassing access-point geolocation, AFC channel availability tracking and/or access-point radio resource management.

Figure 8:
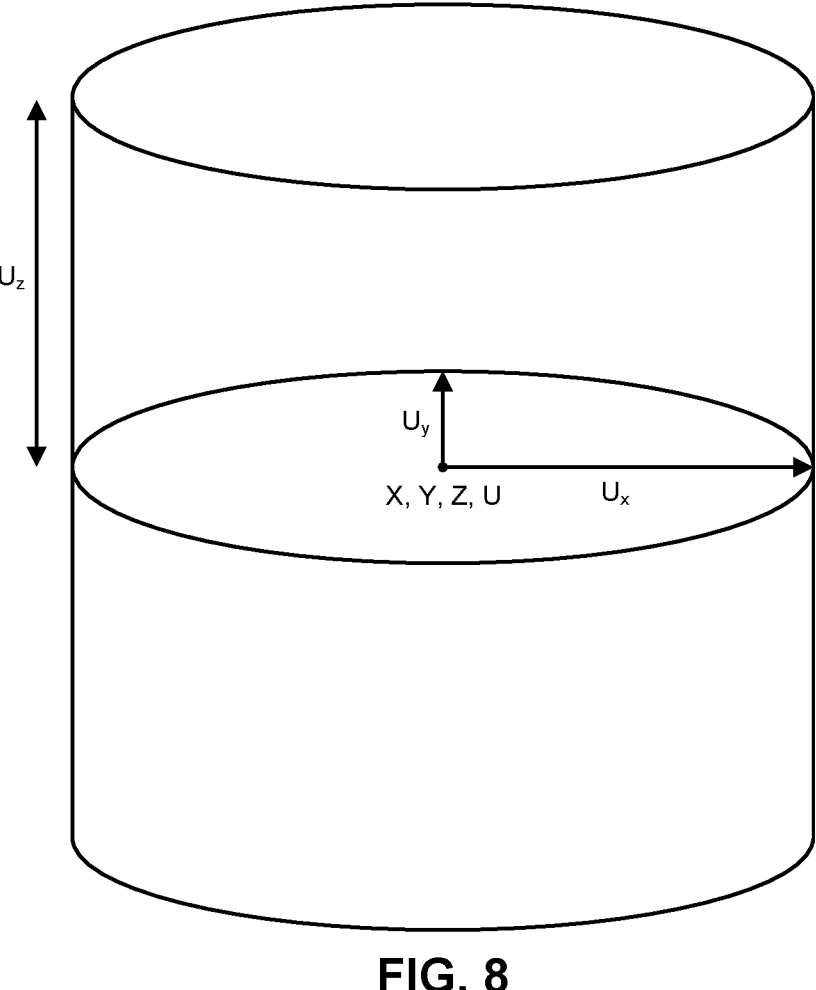
FIG. 8 is a drawing illustrating an example of a location of an electronic device in FIG. 1 in accordance with an embodiment of the present disclosure.

We now describe the calculation of the locations of access points in more detail. FIG. 8 presents a drawing illustrating an example of a location of an electronic device in FIG. 1. Notably, an access point may be anywhere within an elliptical circle, where X may be longitude, Y may be latitude, Z may be the height above the ground, and U may be the uncertainty ($U_X$, $U_y$, $U_z$).

A path-loss equation may be defined as $$D = \alpha 10^{(P_T - P_R)/10n},$$

where D is the distance (in meters), $P_T$ is the transmit power (which may be assumed to be 0 dBm), $P_R$ is the receive power (in dBm), $\alpha$ is a normalization coefficient (which may be assumed to be 0.1) and n is a path loss exponent (which may be assumed to be two). For example, when the receive power is –50 dBm, a distance to a transmitting access point may be less than or equal to 32 m. Note that free-space conditions may be assumed, which may provide an upper bound on the distance between the transmitting access point and the receiving access point.

Figure 9:
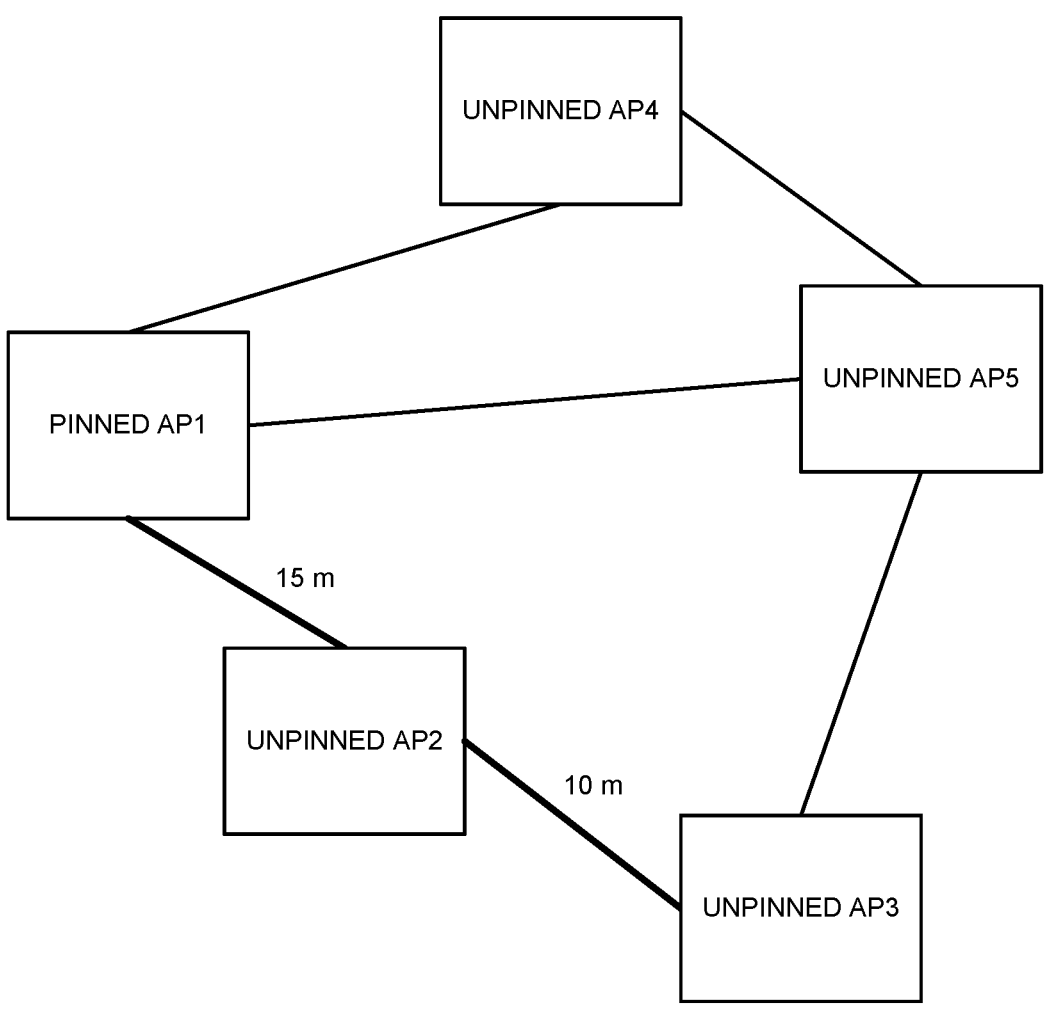
FIG. 9 is a drawing illustrating an example of a shortest path between electronic devices in FIG. 1 in accordance with an embodiment of the present disclosure.

FIG. 9 presents a drawing illustrating an example of a shortest path between electronic devices in FIG. 1. Notably, access point 2 may hear (or receive wireless signals from) access point 1, and access point 3 may hear access point 2, but access point 3 may not hear access point 1. Therefore, a conservative shortest-path estimate of the distance between access point1 and access point 3 may be $D_{AP1+AP2}+D_{AP2+AP3}$ or less than or equal to 25 m (10 m+15 m). Moreover, common techniques for computing the shortest path may be very efficient, even for graphs with many nodes (or access points).

Note that geolocating an unpinned access point from a pinned access point may use the know location and uncertainty of the pinned access point ($L_1=(X_1, Y_1, Z_1, U_1)$, where $U_1=(U_{x1}, U_{y1}, U_{z1})$) to calculate the location and the uncertainty of the unpinned access point ($L_2=(X_1, Y_1, Z_1, U_2)$, where $U_2=(U_{x1}+D, U_{y1}+D, U_{z1})$) based at least in part on the received signal strength of the pinned access point measured at the unpinned access point, where D is less than some number of meters.

Figure 10:
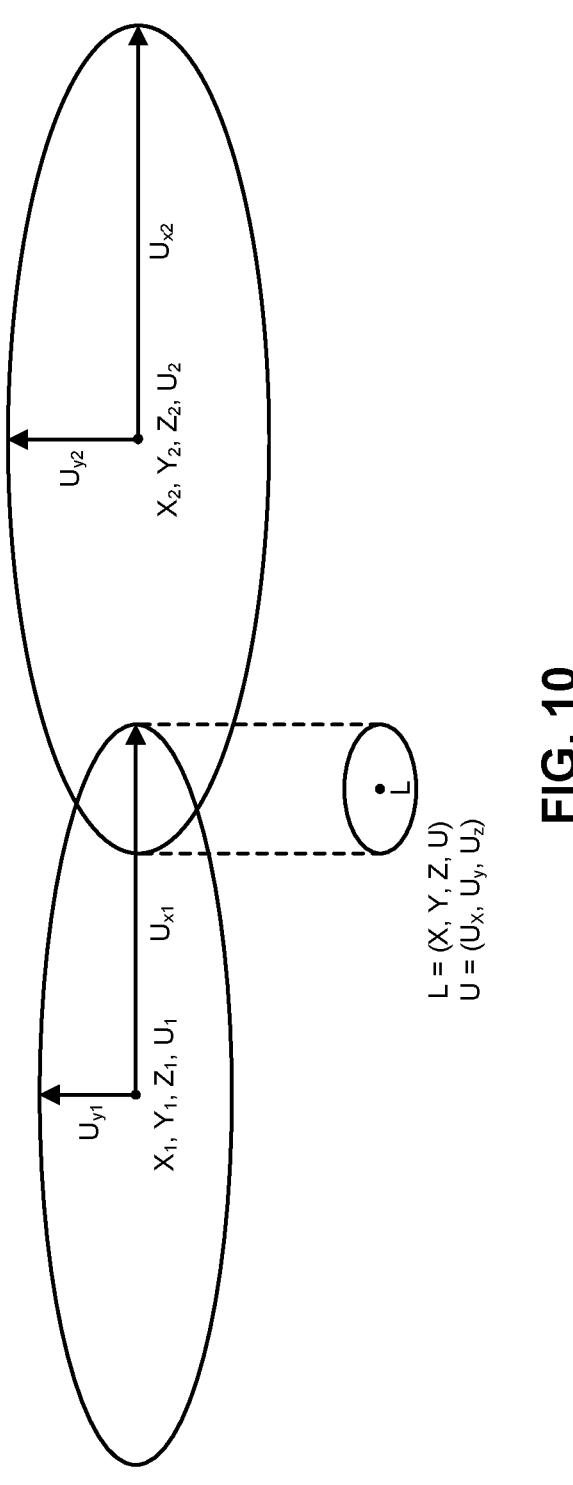
FIG. 10 is a drawing illustrating an example of simultaneous position constraints in accordance with an embodiment of the present disclosure.

As shown in FIG. 10, presents a drawing illustrating an example of simultaneous position constraints, when there is more than one pinned access point, the constraints may greatly increase, so the accuracy of the calculated location may be improved. Notably, the calculated location may simultaneously satisfy location constraints of both access points. Based at least in part on the intersection of volumes, the location (center) and the uncertainty (surface of intersections) may be calculated.

For example, a first pinned access point may be at location $(X_1, Y_1, Z_1, U_1)$, where $U_1=(U_{x1}, U_{y1})$, and a second access point may be at location $(X_2, Y_2, Z_2, U_2)$, where $U_2=(U_{x2}, U_{y2})$. Using the communication techniques, calculate a location $L=(X, Y, Z, U)$, where $U=(U_x, U_y, U_z)$.

In a first case, $X_1+U_{x1}\geq X_2-U_{x2}$ and $U_{y1}\leq U_{y2}$. Then, $U_x=((X_1+U_{x1})-(X_2-U_{x2}))/2$, $X=X_2-U_{x2}+U_x$, $Y=Y_1$ and $U_y=U_{y1}$. Other cases may include: $X_1+U_{x1}\geq X_2-U_{x2}$ and $U_{y1}>U_{y2}$; $X_1+U_{x1}<X_2-U_{x2}$ and $U_{y1}\leq U_{y2}$; and $X_1+U_{x1}<X_2-U_{x2}$ and $U_{y1}>U_{y2}$.

We now describe embodiments of an electronic device, which may perform at least some of the operations in the communication techniques. FIG. 11 presents a block diagram illustrating an example of an electronic device 1100 in accordance with some embodiments, such as one of: base station 108, one of electronic devices 110, computer system 112, one of access points 116, one of radio nodes 118, and/or switch 128. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, ASICs, microcontrollers, programmable-logic devices, graphical processor units (GPUs) and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory (which collectively or individually are sometimes referred to as a 'computer-readable storage medium'). In some embodiments, instructions for processing subsystem 1110 in memory subsystem 1112 include: one or more program modules or sets of instructions (such as program instructions 1122 or operating system 1124), which may be executed by processing subsystem 1110. Note that the one or more computer programs may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). (While FIG. 11 includes one or more antennas 1120, in some embodiments electronic device 1100 includes one or more nodes, such as nodes 1108, e.g., an antenna node, a connector or a pad, which can be coupled to the one or more antennas 1120. Thus, electronic device 1100 may or may not include the one or more antennas 1120.) For example, networking subsystem 1114 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 1100 may be adapted or changed using pattern shapers (such as reflectors) in one or more antennas 1120 (or antenna elements), which can be independently and selectively electrically coupled to ground to steer the transmit antenna radiation pattern in different directions. Thus, if one or more antennas 1120 includes N antenna-radiation-pattern shapers, the one or more antennas 1120 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting frames and/or scanning for frames transmitted by other electronic devices.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Electronic device 1100 can be (or can be included in) any electronic device with at least one network interface. For example, electronic device 1100 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program instructions 1122 are included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 1114. The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1122, operating system 1124 (such as a driver for interface circuit 1118) or in firmware in interface circuit 1118. Alternatively or additionally, at least some of the operations in the communication techniques may be implemented in a physical layer, such as hardware in interface circuit 1118.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 6 GHz, 7 GHz, 60 GHz, and/or a band of frequencies used by a Citizens Broadband Radio Service or by LTE. In some embodiments, the communication between electronic devices uses multi-user transmission (such as OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

The invention claimed is:

1. A computer system, comprising:
an interface circuit configured to communicate with first access points;
a processor; and
memory that stores program instructions, wherein, when executed by the processor, the program instructions cause the computer system to perform operations comprising:
receiving, associated with the first access points, first information specifying first locations of the first access points, first uncertainties in the first locations, and results of wireless scans, wherein given first information received from a given first access point among the first access points comprises a first location of the given first access point, a first uncertainty in the first location and a result of a wireless scan performed by the given first access point;
providing, addressed to the first access points, second information specifying the first locations, the first uncertainties in the first locations, and the results of the wireless scans; and
receiving, associated with the first access points, third information specifying second locations of the first access points and second uncertainties in the second locations, wherein given third information received from the given first access point among the first access points comprises a second location of the given first access point and a second uncertainty in the second location, and wherein the second location and the second uncertainty comprise revisions to the first location and the first uncertainty.

2. The computer system of claim 1, wherein the first locations, the second locations, the first uncertainties and the second uncertainties are based at least in part on known locations of second access points.

3. The computer system of claim 2, wherein the second access points comprise Global Positioning System (GPS) receivers.

4. The computer system of claim 2, wherein the operations comprise providing, addressed to the first access points, the known locations of the second access points.

5. The computer system of claim 1, wherein the first access points do not comprise Global Positioning System (GPS) receivers.

6. The computer system of claim 1, wherein the computer system comprises a controller of the first access points.

7. The computer system of claim 1, wherein the result of the wireless scan comprises received signal strengths associated with one or more of the first access points measured by the given first access point.

8. The computer system of claim 1, wherein the wireless scan is in a 6 GHz band of frequencies or a 7 GHz band of frequencies.

9. The computer system of claim 1, wherein the third information comprises second results of second wireless scans, and wherein the given third information received from the given first access point comprises a second result of a second wireless scan performed by the given first access point.

10. The computer system of claim 1, wherein the first locations and the second locations comprise longitudes and latitudes of the first access points.

11. The computer system of claim 1, wherein the first locations and the second locations comprise a common height of the first access points.

12. The computer system of claim 11, wherein the common height comprises: one half of a height of a building in which the first access points are located; or a user-reported height.

13. The computer system of claim 1, wherein the operations comprise receiving, associated with the given first access point, a request for the second information, and the second information is provided to the given first access point in response to the request.

14. The computer system of claim 1, wherein the results of the wireless scans comprise reduced neighbor reports.

15. A non-transitory computer-readable storage medium for use in conjunction with a computer system, the computer-readable storage medium storing program instructions, wherein, when executed by the computer system, the program instructions cause the computer system to perform operations comprising:
receiving, associated with first access points, first information specifying first locations of the first access points, first uncertainties in the first locations, and results of wireless scans, wherein given first information received from a given first access point among the first access points comprises a first location of the given first access point, a first uncertainty in the first location and a result of a wireless scan performed by the given first access point;

providing, addressed to the first access points, second information specifying the first locations, the first uncertainties in the first locations, and the results of the wireless scans; and receiving, associated with the first access points, third information specifying second locations of the first access points and second uncertainties in the second locations, wherein given third information received from the given first access point among the first access points comprises a second location of the given first access point and a second uncertainty in the second location, and wherein the second location and the second uncertainty comprise revisions to the first location and the first uncertainty.

16. The non-transitory computer-readable storage medium of claim 15, wherein the first locations, the second locations, the first uncertainties and the second uncertainties are based at least in part on known locations of second access points.

17. A method for distributing locations of access points, comprising:

by a computer system:

receiving, associated with first access points, first information specifying first locations of the first access points, first uncertainties in the first locations, and results of wireless scans, wherein given first information received from a given first access point among the first access points comprises a first location of the given first access point, a first uncertainty in the first location and a result of a wireless scan performed by the given first access point;

providing, addressed to the first access points, second information specifying the first locations, the first uncertainties in the first locations, and the results of the wireless scans; and receiving, associated with the first access points, third information specifying second locations of the first access points and second uncertainties in the second locations, wherein given third information received from the given first access point among the first access points comprises a second location of the given first access point and a second uncertainty in the second location, and wherein the second location and the second uncertainty comprise revisions to the first location and the first uncertainty.

18. The method of claim 17, wherein the first locations, the second locations, the first uncertainties and the second uncertainties are based at least in part on known locations of second access points.

19. The method of claim 18, wherein the second access points comprise Global Positioning System (GPS) receivers.

20. The method of claim 17, wherein the first locations and the second locations comprise longitudes and latitudes of the first access points.

* * * * *